Figure 1:
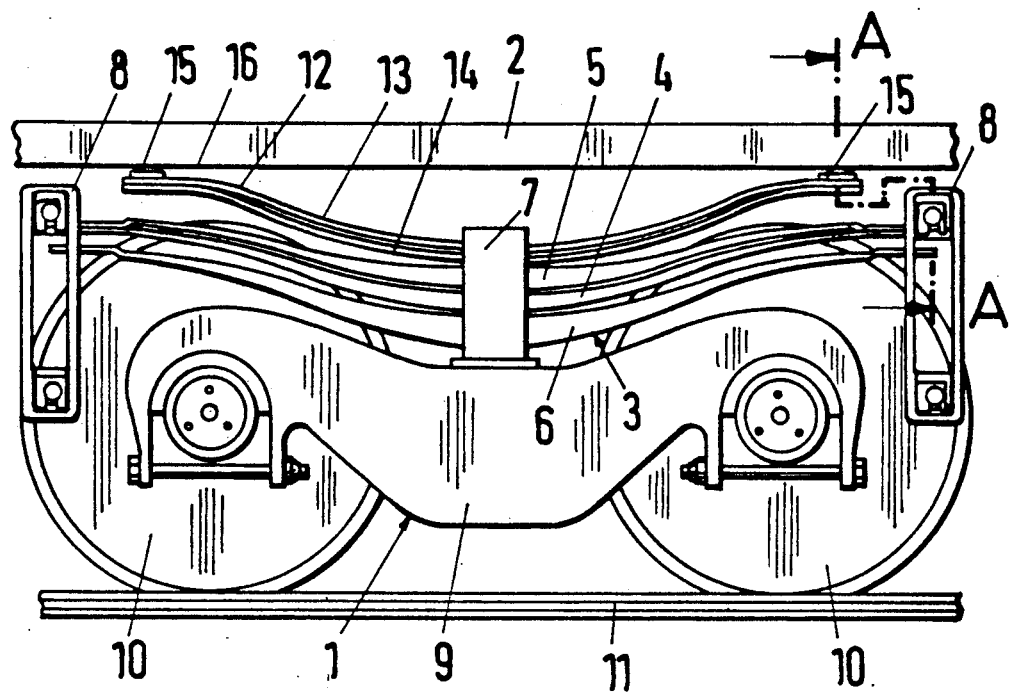

United States Patent [19]

Irle et al.

[11] Patent Number: 5,039,071
[45] Date of Patent: Aug. 13, 1991

[54] RUNNING GEAR OF A RAILWAY VEHICLE

[75] Inventors: Rudolf Irle, Plettenberg; Alfred Lohmann, Siegen, both of Fed. Rep. of Germany; Boris S. Terlecky, Woodridge, Ill.

[73] Assignee: Krupp Bruninghaus GmbH, Werdohl, Fed. Rep. of Germany

[21] Appl. No.: 294,185

[22] Filed: Jan. 6, 1989

[30] Foreign Application Priority Data

Jan. 12, 1988 [DE] Fed. Rep. of Germany ....... 3800587

[51] Int. Cl.⁵ .............................................. F16F 3/02
[52] U.S. Cl. .................... 267/52; 105/197.05; 267/3; 267/7; 267/44; 267/148; 267/262; 280/718
[58] Field of Search .................... 267/3, 7, 52, 262, 44, 267/45, 47, 148, 149; 280/718, 719; 105/197.05

[56] References Cited

U.S. PATENT DOCUMENTS

| 280,858 | 7/1883 | Pine | 267/262 |
|---|---|---|---|
| 345,898 | 7/1886 | Hendricks | 267/262 |
| 1,463,876 | 8/1923 | Loe | 267/45 X |
| 1,967,027 | 7/1934 | Hebner | 267/262 |
| 2,304,780 | 12/1942 | Fries | 262/45 |
| 2,337,073 | 12/1943 | Townsend | 267/262 |
| 4,637,595 | 1/1987 | Mishima et al. | 267/149 X |

FOREIGN PATENT DOCUMENTS

| 9726 | 9/1979 | European Pat. Off. | |
|---|---|---|---|
| 1455098 | 10/1968 | Fed. Rep. of Germany | 267/3 |
| 400841 | 10/1933 | United Kingdom | 267/262 |

Primary Examiner—George E. A. Halvosa
Attorney, Agent, or Firm—Kinzer, Plyer, Dorn, McEachran & Jambor

[57] ABSTRACT

Running gear (1) of a railway vehicle, which is suspended on the undercarriage (2) of the railway vehicel by blade support springs (3) and suspension attachment (8), with the additional arrangement of an additional blade spring as absorption spring (12); the absorption spring (12) is essentially more flexible than the rigid blade support spring (3), and the absorption spring (12), is tensed into the spring band (7) of the blade support spring (3). Blade support spring (3) and absorption spring (12) are kinematically connected in parallel.

6 Claims, 6 Drawing Sheets

Figure 3:
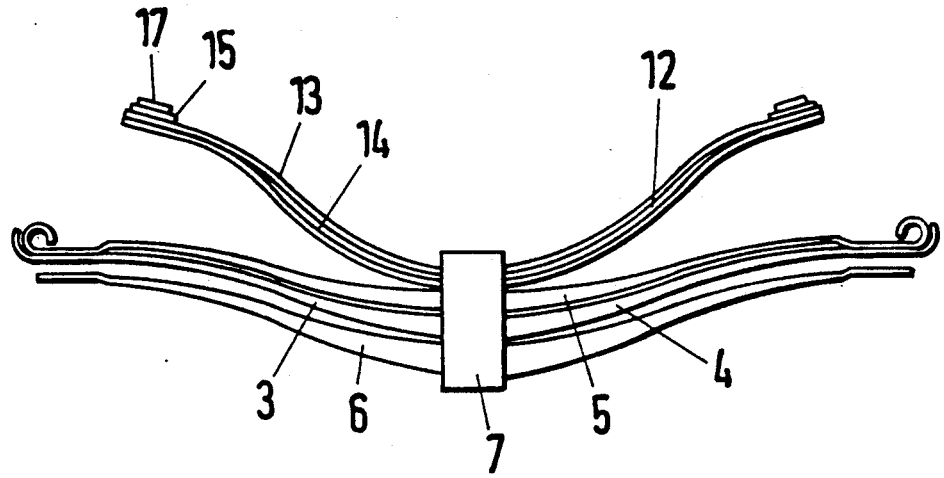
Figure 4:
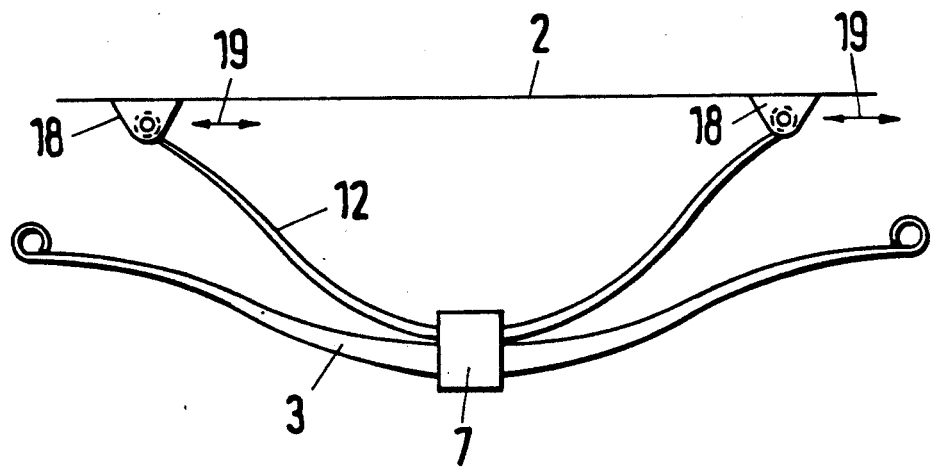

Fig. 8  Theoretical Characteristic Curve for the Spring System in Accordance with Figure 4
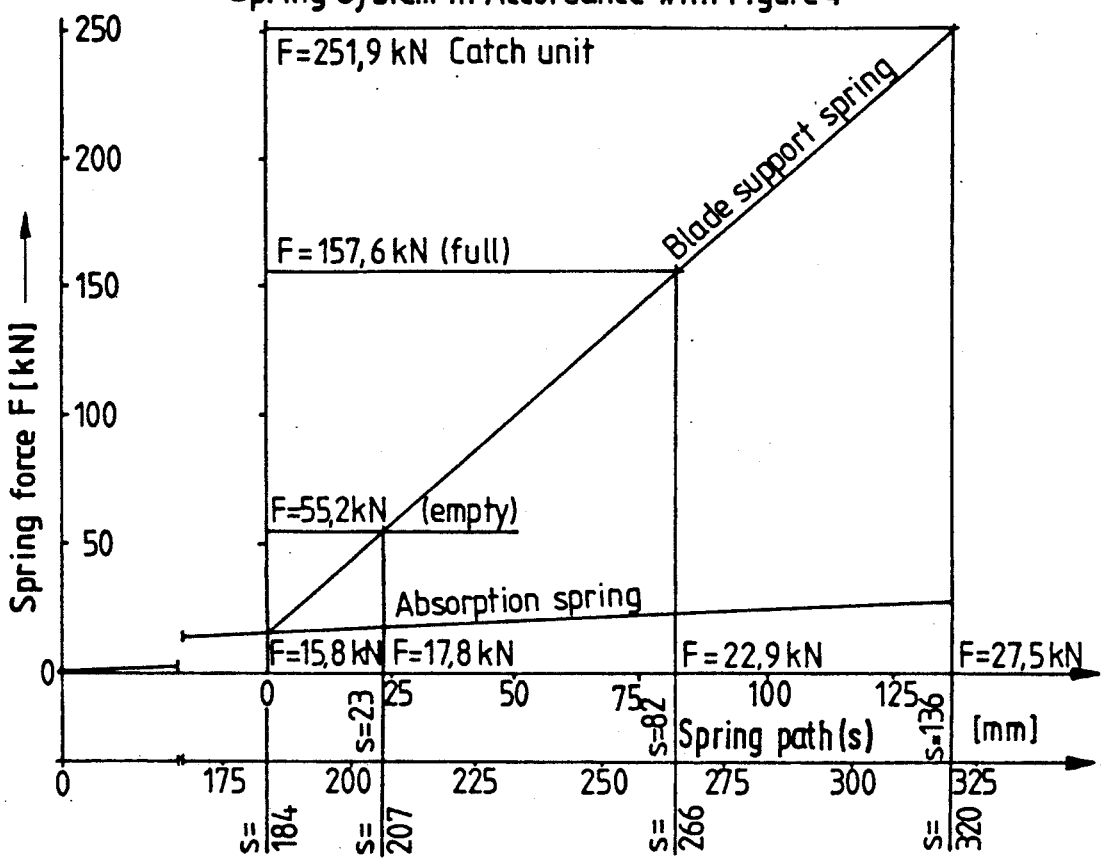
Fig. 9  Theoretical Characteristic Curve for the Spring System in Accordance with Figure 3
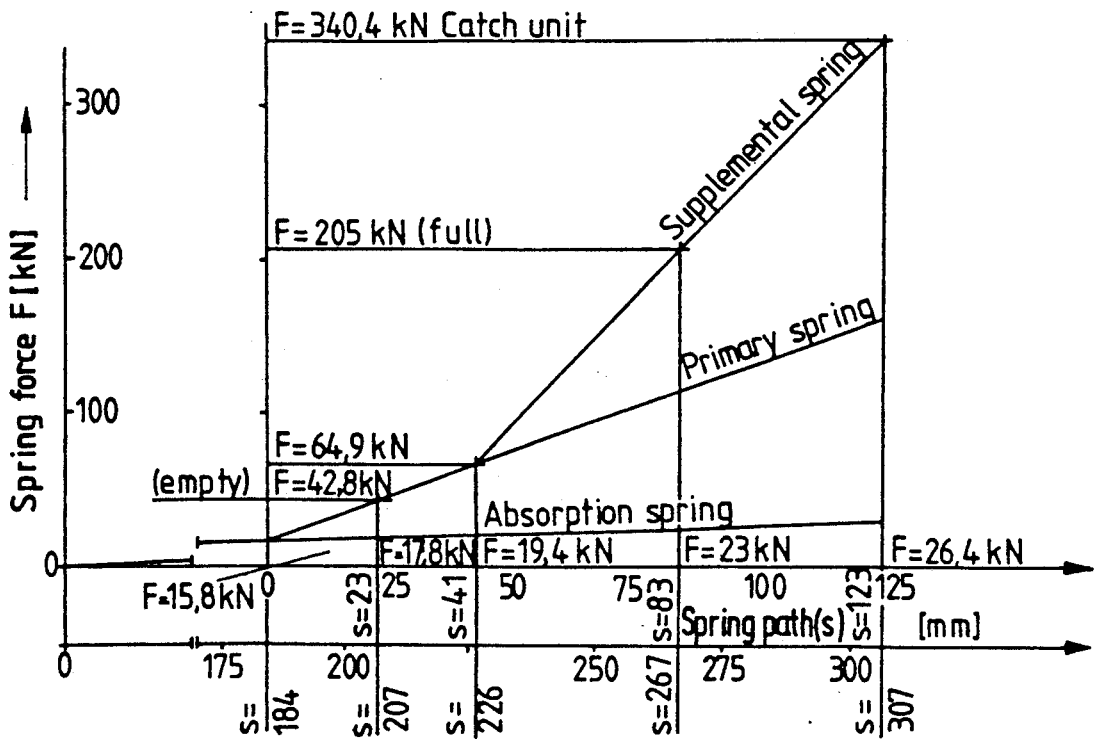

RUNNING GEAR OF A RAILWAY VEHICLE

The invention concerns the running gear of a railway vehicle, whereby the running gear is suspended on the undercarriage of the railway vehicle by means of blade support springs, which each consist of several individual blades held together by means of a central spring band, and by means of a suspension attachment, and in which, in addition to every blade support spring, an additional, prestressed blade spring is provided above the same, which has one of its counter-supports in the undercarriage.

The invention proceeds from a running gear for railway vehicles, as known from the European patent 0 009 726, which contains, in individual form, measures for the rotational inhibition of individual and double axis running gears.

The present invention also concerns measures which influence the technical running behavior of railway vehicles. In order to improve the technical running behavior of axes or running gears of railway vehicles suspended with suspension attachments, hydraulic damper units or so-called "rotation impeding springs" are at the present time known, in addition to other Complicated types of roll absorbing systems. These known systems have the task of damping vibrations which arise, in particular, during straight-out departure and at high speeds, corresponding to specific degrees of freedom.

In this hydraulic absorption devices have the disadvantage that they are complicated and expensive, and have a lifetime which is too short for use in the area of materials transport.

In rotation impeding springs, such as are the object of the European patent 0 009 726, which defines the classification, there is involved in principle a prestressed blade spring positioned between the undercarriage of the railway vehicle and the support spring eyes, which blade spring is positioned in a position neutral to the spring deflection condition of the running gear, so that the corresponding friction forces, which are supposed to cause the absorption, remain nearly constant over the entire spring deflection range, and can not be increased for partially or completely loaded travel conditions.

It is the task of the invention to find a simple absorption arrangement, which makes it possible to meet the absorption requirements specifically required, and to adapt these in an appropriate manner to various load conditions.

This task is solved through the fact that the additional blade spring is connected kinematically in parallel to the assigned blade support spring, as an absorption spring, and is more resilient relative to the more rigid blade support spring, onto which not more than 25% of the maximum support load which can be absorbed in common by the blade support spring and the absorption spring is placed; and that, the absorption springs are co-tensed into the spring band, which holds together the individual blades of the blade support spring, and supports itself on the undercarriage with their ends by means of sliding elements.

The invention has the advantage that the spring deflection condition of the absorption spring can be adjusted to a specific pre-tension force corresponding to the empty load of the railway vehicle, since the empty condition turns out to be particularly critical for quiet running.

In this state of affairs, at higher travel speeds, rolling movements, that is to say, rotational movements of the running gear around the vertical running gear axis, can appear in the frequency range of approximately 3 to 8 Hz (Hertz), which impair running safety, and thereby, during travel operations, make a reduction in speed necessary. In this, the invention offers the advantage, because of the co-cushioning absorption springs that, through the influencing of the cushioning levels which is made possible through the construction, a defined friction force increase between the ends of the absorption springs and the undercarriage can be obtained, up to a desired traveling position.

Through this means, it is also possible to suppress instabilities which may possibly arise in partially-loaded or fully-loaded railway vehicles.

Through the kinematic parallel connection of the absorption springs in accordance with the invention, the blade support springs are relieved of load, if only to a limited extent, so that the use of additional materials for the absorption springs can be thoroughly compensated by materials reductions in the blade support spring.

Since, in vertical Cushioning processes, horizontal length changes arise in the absorption springs, vertical suspension processes are also dampened. The invention thereby supports the function of the devices for friction reinforcement occasionally provided in flat support springs, as in accordance, for example, with U.S. Pat. No. US-PS 40 22 449.

Finally, the arrangement of the absorption springs in the spring band of the blade support spring further provided in accordance with the invention, represents an elegant solution for the attachment of the additional bade spring without additional measures. Thus, only very slight additional vertical construction space is also required.

One further advantage is the simple formation of the slide surfaces of the slide elements on the undercarriage of the railway vehicle, which can also be adapted, without particular expense, to those in large recesses of the running gear, for example, for use in narrow curved tracks, without the danger of derailments occurring.

The spring constants of the absorption springs are supposed to move advantageously relative to the spring constants of the blade support spring. Consequently, the spring constants ($R_2 \times N/mm$) of the absorptions springs should have 0.01 to 0.3 times the amount of the spring constants ($R_1 \times N/mm$) of the blade support spring.

To form the slide surfaces between the undercarriage and the blade spring ends. Separate friction elements are suitably provided, which can also be designated as interchangeable wear plates.

Another measure of the invention is that which provides that the friction elements are arranged, in the longitudinal direction of the vehicle, in a displaceable manner on the undercarriage with high friction value, and, laterally to the longitudinal direction of the vehicle, with low frictional value has the advantageous effect that in both stated directions, different friction forces arise, and these friction forces can be practically so adjusted to one another, that they yield optimal absorption ratios.

One preferred form of execution of the invention furthermore provides that the absorption spring is a parabolic spring.

Further the absorption spring may, in order to save weight consist of fiber-reinforced plastic.

The invention will be described in the following by means of the examples of execution and diagrams depicted in the figures.

Figure 2:
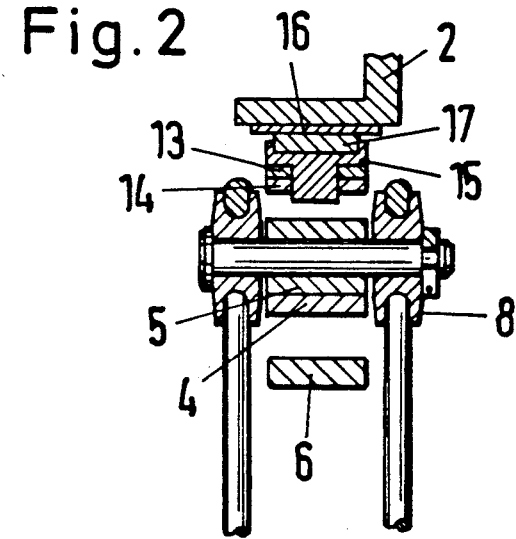
Figure 5:
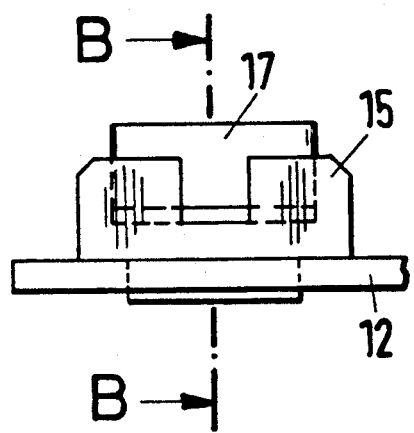
Figure 6:
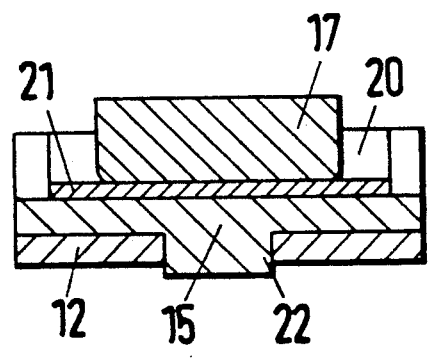
Figure 7:
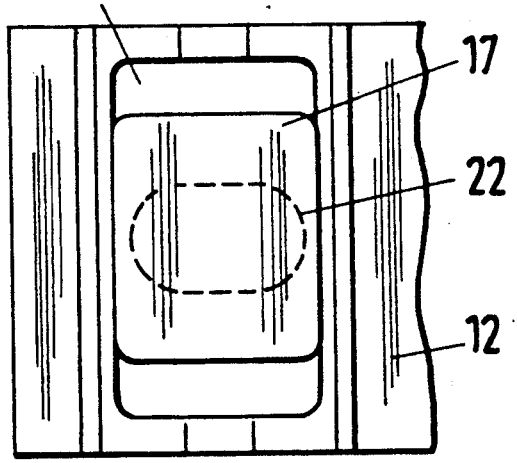
Figure 10:
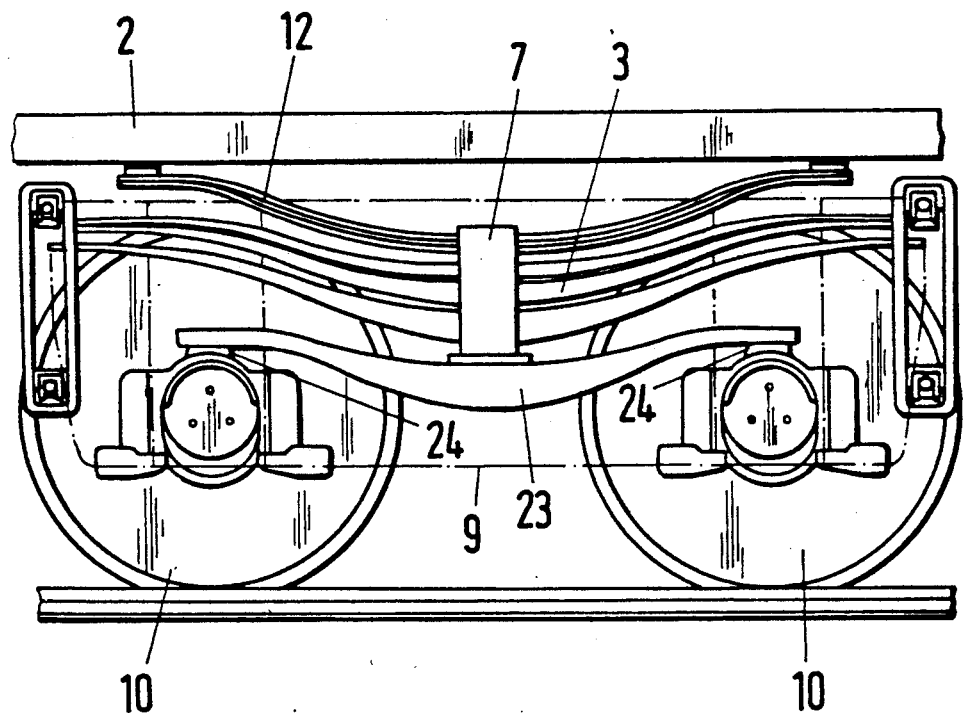
Figure 11:
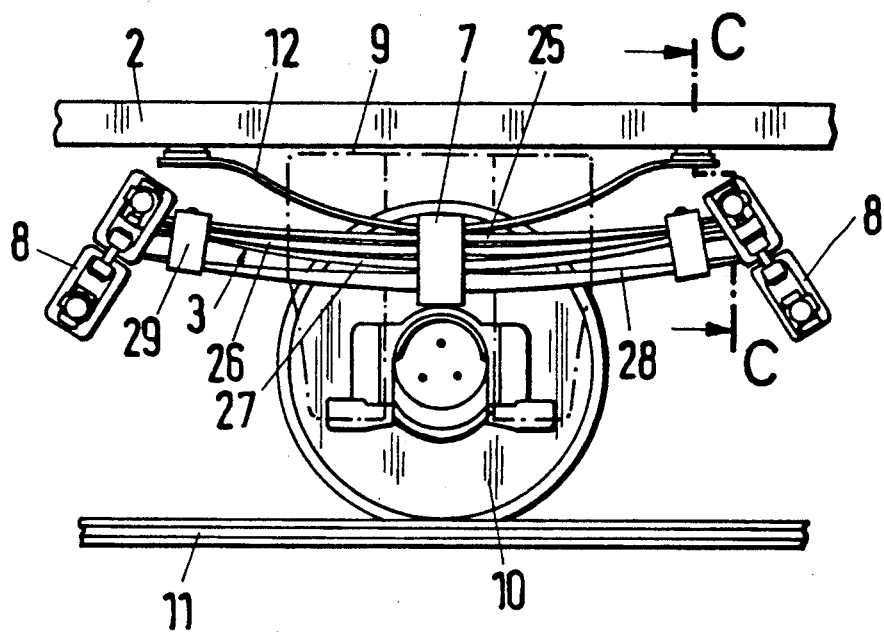
Figure 12:
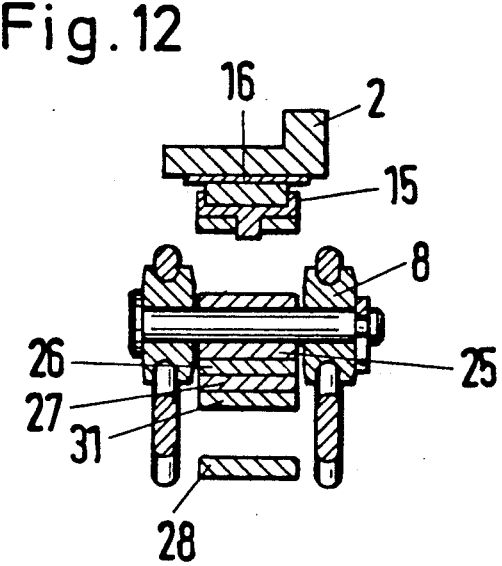

These depict the following:

FIG. 1: The running gear of a railway vehicle with an absorption spring Consisting of two individual blades;

FIG. 2: A cross-section along the line A—A through FIG. 1;

FIG. 3: The spring connection from FIG. 1, in disassembled condition;

FIG. 4: A spring connection, which is composed of a blade support spring and an absorption spring;

FIG. 5: Details of the end area of an absorption spring;

FIG. 6: A cross-section along the line B—B through FIG. 5;

FIG. 7: A view from above of the arrangement in accordance with FIG. 5;

FIG. 8: A characteristic curve diagram for a spring arrangement in accordance with FIG. 4;

FIG. 9: A characteristic curve diagram for a spring arrangement in accordance with claim 3;

FIG. 10: A double axis running gear:

FIG. 11: A single axis suspension;

FIG. 12: A cross-section along the line C—C through FIG. 11.

In FIG. 1, there is depicted a running gear (1), namely, a double-axis running gear of a railway vehicle and its attachment to the undercarriage (2) of the railway vehicle. The running gear (1) is, by means of blade support springs (3), which each consist of three individual blades (4, 5 and 6), and are held together by means of a central spring band (7), suspended on the undercarriage (2) of the railway vehicle by means of suspension attachments (8).

The bearing load conducted over the suspension attachment (8) is conducted into the running gear frame (9) by means of the central spring band (7), which framework rests on rails (11) by means of the wheel and axis assembly (10).

By means of the multiple-spring blade spring support (3), an additional blade spring, namely a prestressed absorption spring (12) is positioned, which is composed of the spring blades (13 and 14). The absorption spring (12), that is to say, the spring blades (13 and 14), are tensed together in the central spring band (7) of the blade support spring (3).

To explain the support of the absorption spring (12) on the undercarriage (2), reference is made to figures, FIG. 1 and FIG. 2. In particular, FIG. 2 depicts, as a cross-section along the line A—A through FIG. I that the absorption spring (12) abuts on the undercarriage (2) on slide surfaces (16) by means of end pieces (15). The support occurs by means of interchangeable pressure pieces (17). which abut on the slide surfaces of the slide elements (16). Through a suitable combination of materials, a desirable friction between the slide elements (16) and the pressure piece (17) can be adjusted, and thus a desirable absorption effect can be attained.

FIG. 3 depicts the absorption assembly from FIG. 1 in a disassembled condition, namely, a spring arrangement of a progressive support spring (3) with a-primary support spring Consisting of the individual blades (4 and 5), and an additional spring formed by the individual blade (6), and of a more resilient absorption spring (12) with the spring blades (13 and 14). For a one-axis running gear, an absorption arrangement in accordance with the schematic depiction in accordance with FIG. 4 could come into consideration.

There, the one-spring bade support spring (3) is held together with a one-blade absorption spring (12) by means of a common spring band (7). On the ends of the absorption spring (12), spring eyes are provided, which hold these to the undercarriage (2) by means of slide pieces (18). Double arrows (19) indicate the longitudinal displacement of the slide pieces (18). The figures, FIG. 5, FIG. 6 and FIG. 7, depict, in a common view, one Particular development of the support of the free ends of the absorption springs (12), namely, a form of execution in which the pressure pieces (17) can be moved laterally to the longitudinal direction of the vehicle, and into the end pieces (15) of the absorption spring (12). To this purpose, the end piece (15) has a recess (20) similar to a connecting link, in which the the pressure piece (17) can move on an insert unit (21) laterally to the longitudinal direction of the vehicle, in which the section in accordance with FIG. 6 proceeds. The friction coefficient between the pressure piece (17) and the insert unit (21) should be slight.

FIGS. 5 to 7 also show that the end piece (15) has a central attachment piece (22), by means of which the end piece is attached to the absorption spring (12).

FIG. 8 depicts in diagram form the theoretical characteristic curve for the spring system in accordance with FIG. 4.

A force/spring path diagram is depicted. The abscissa contains two scales, which differ by their zero points. In the lower scale, the absolute spring path of the absorption spring is depicted; in the upper scale, there is depicted the absolute spring path of the blade support spring. The ordinate shows the spring force of the spring system. Furthermore, the characteristic lines of the absorption springs (12) are depicted with stress values in the various load positions, as well as the characteristic lines of the linear blade support springs, including the absorption spring (12).

For example, the blade support blade traverses, up to the empty load position with 55.2 KN (kiloneutons) stress, a spring path of 23 mm (millimeters), while the absorption spring has already returned to this position by 207 mm.

In departure from FIG. 8, FIG. 9 depicts the characteristic curve of an absorption spring with progressive blade support spring in accordance with FIG. 1 and FIG. 3. The view in accordance with FIG. 1 corresponds to the empty load position in accordance with FIG. 9, at F=42.8 KN. Up to this position, the blade support spring moves 23 mm, and the absorption spring moves 207 mm.

The desired prestressing force of the absorbing spring in the empty load position amounts in both diagrams to 17.8 KN.

The individual blades of the blade support spring (3) are, as a rule, made of steel, but the absorption springs (12) may be of plastic or of steel.

FIG. 10 depicts the invention in a double axis running gear, in which the axes are held with considerable Clearance as individual axes in a tension-free running gear framework (9), which is only schematically indicated here by a dotted line. The support load is conducted here over the central spring band (7), a rigid parabolic support (23) and over rubber elements (24). to both wheel and axis sets (10).

FIG. 11 depicts the invention with a simple running gear. In this construction, a progressive blade support spring (3) is provided with the individual blades (25, 26, 27, and 28), to which a one-blade absorption spring (12) of steel, or, in order to save weight, of fiber-reinforced plastic, is coordinated. The upper individual blades (25, 26, and 27) are held together on their ends by means of end bands (29) by way of a friction reinforcement, while the lower individual blade (28) has more clearance with the end bands (29).

FIG. 12 shows a cross-section along the line C—C through FIG. 11, that the highest individual spring (25) is placed on its ends with a spring eye around a bolt (30) of the suspension attachment (8), and that the individual blades (25, 26, and 27) are held together by means of a sheet metal piece 31) of the end band (29).

We claim:

1. Running gear of a railway vehicle, whereby the running gear is suspended on the undercarriage of the railway vehicle by means of blade support springs having free ends from which depend suspension attachments which have lowermost ends connected to the vehicle to receive the vehicle load and transfer the same to said free ends of said springs, said suspension attachments permitting said car body to move at least longitudinally with respect to said running gear, said blade support springs each comprising at least one blade connected to the running gear by a central band intermediate said free ends, and in which, in addition to each blade support spring, an additional, prestressed blade spring is provided having at least one countersupport adjacent the undercarriage; characterized in that the additional blade spring is kinematically connected in parallel to the coordinated blade support spring as an absorption spring;

that the absorption spring is a spring which is considerably more resilient with a considerably reduced spring rate relative to the blade support spring and on to which is imposed more than 25% of empty vehicle weight but not more than 25% of the maximum support load which can be absorbed in common by the blade support spring and the absorption spring;

and that, the absorption spring is clamped into a spring band, which holds together both the blade support spring and the absorption spring, and said absorption spring supporting itself on the undercarriage with its free ends by means of slide elements which allow both longitudinal and lateral relative movement between the vehicle undercarriage and the absorption spring.

2. Running gear in accordance with claim 1, characterized in that the spring constant $R_2$(N/mm) of the absorption spring, in proportion to the spring constants $R_1$ (N/mm) of the blade support spring, lies in the range of the function:

$$R_2 \text{ (N/mm)} = 0.01 \text{ to } 0.3 \ R_1 \text{ (N/mm)}.$$

3. Running gear in accordance with claim 2, characterized in that the slide elements, to which the free ends of the absorption spring are opposed, are constructed as friction elements and are engaged by replaceable pressure pieces secured to the free ends of the absorption spring allowing the friction coefficient between slide elements and pressure pieces to be selected.

4. Running gear in accordance with claim 3, characterized in that the friction elements are positioned in a displaceable manner on the undercarriage, with high friction value in the longitudinal direction of the vehicle, and with low friction value laterally to the longitudinal direction of the vehicle.

5. Running gear in accordance with claim 4, characterized in that the absorption spring is a parabolic spring.

6. Running gear in accordance with claim 5, characterized in that the absorption spring consists of fiber-reinforced plastic.

* * * * *